No. 760,155. PATENTED MAY 17, 1904.
G. H. SARGENT.
DIFFERENTIAL COMMUTATION TICKET.
APPLICATION FILED APR. 6, 1903.
NO MODEL.

Witnesses:
F. W. H. Clay
Chas. H. Ebert

Inventor:
George H. Sargent
By Paul Synnestvedt
Atty.

No. 760,155. Patented May 17, 1904.

UNITED STATES PATENT OFFICE.

GEORGE H. SARGENT, OF CHICAGO, ILLINOIS.

DIFFERENTIAL COMMUTATION-TICKET.

SPECIFICATION forming part of Letters Patent No. 760,155, dated May 17, 1904.

Application filed April 6, 1903. Serial No. 151,353. (No model.)

*To all whom it may concern:*

Be it known that I, GEORGE H. SARGENT, a citizen of the United States, residing at Chicago, in the State of Illinois, have invented a certain new and useful Differential Commutation-Ticket, of which the following is a specification.

My invention especially relates to that class of railway tickets known as trip tickets or "commutation tickets," such as are used by railways and other transportation companies for the purpose of furnishing regular passengers with a conventional form of tickets good for a given number of trips or for a given length of time. It is especially designed to meet the demand for tickets in which there are provisions both for the ordinary limited time personal use trip and also for additional trips which may be made by any party accompanying the owner of the ticket and at any time until used up. The objects are to avoid the inconvenience of having a ticket which must be used a certain number of times within a fixed period of time, whereby it frequently happens that the ticket is not all used up before the end of the time; and also the further inconvenience of being required to pay extra full fare whenever the owner of the ticket is accompanied by other parties. Further objects are to provide a ticket for the purpose specified which readily indicates on its face the use and mode of manipulation and readily presents differential coupons for the two purposes. The ordinary custom is for a regular traveler upon a given line of road to buy a commutation ticket which has 60 coupons, on the supposition that he will take two rides a day over the road, but it happens more often than otherwise that the 60 coupons are not used up within the month, wherefore there is great waste.

The objects of my invention in part, are to provide a ticket which has some coupons restricted to the regular and personal use of the ticket holder, and an additional number to be used either by him or by others. By this means it is possible to use up the entire ticket whether it is all used by the ticket holder or not. Other objects of my invention are to make a clear distinction on the ticket between the personal coupons for the regular traveler and those which may be used by him or others indifferently, and to render the present condition of the ticket at any time evident at a glance.

I have illustrated in the accompanying drawing a preferred form of my ticket, where it will be seen that the contract is printed in the center of the ticket $b$, and around two of the sides are the regular non-transferable coupons $d$, for the ticket holder while around the other sides are placed a series of coupons $e$, marked 51 to 60 on the drawing, which are made in a different color or design from those marked 2 to 50 and are upon a separate portion of the ticket. The respective ends $a$, $c$, of the ticket have removable stubs, one for the agent and one for the auditor of the road. The auditor's stub at the top of the figure is intended to be removed by the conductor upon the first ride of the ticket-holder and the agent's stub at the bottom to be removed upon sale of the ticket. Both of the stubs are marked with the limiting stations as is ordinary. Preferably I print upon the center of the ticket the contract in the following words:

"Fifty Rides Printed in Red, Good for the Use of _____ which Expire _____ 190\_\_, and Ten Rides Printed in Blue, Good for the Use of Bearer, which expire one Year from the Date of Issue. Between _____ and _____."

I prefer to arrange the coupons in numbers running in order around the outside of the top and right sides of the ticket, then back from 25 to 37 toward the top again and thence from 38 to 50 downward again, where the number 51 begins upon the non-individual coupons.

It will be understood that by this arrangement of 50 individual tickets limited as to time, and combined with the 10 tickets unlimited as to individual or time, the holder of the ticket has an elastic limit for the use of the ticket and by using 10 of them for others than himself may use up the entire ticket each month and thus a great saving is attained.

The same device may of course be applied to other commutation tickets than those used upon railways; and its many advantages will readily occur to those familiar with its use.

It will be understood of course, that instead of differing colors being used to distinguish the sets of tickets, they may be distinguished in any other way desired. And it will be understood that the particular form of the contract is not essential to the invention, but any kind or form of contract may be used in the body of the ticket.

By this arrangement the added value of the ticket, and its convenience, will enable the railroad to charge a higher price, sell more tickets, and simplify the accounts; while at the same time the ticket has additional value to the passenger because there is no waste and because of its use for the two purposes. The set of tickets $e$ having a double use are in effect coupons of higher value than the ordinary coupons Nos. 2 to 50.

Having thus described my invention and illustrated its use, what I claim, and desire to secure by Letters Patent, is the following:

1. A differential commutation ticket having coupons in one group indicated as limited to a particular person and a certain short time, and coupons in another group unlimited as to personal use and limited to a longer time.

2. A commutation ticket having a series of coupons marked and distinguished by a contract on the ticket as for individual use and another series of coupons unlimited as to personal use, the two groups being distinguished by different colors, substantially as described.

3. A commutation ticket consisting of a body part containing a contract and a series of coupons marked and distinguished by the contract as limited as to time and another series of coupons limited to a longer time, substantially as described.

4. A commutation ticket consisting of a body part containing a contract and a series of coupons marked and distinguished by the contract as limited to person and another series of coupons unlimited as to person, substantially as described.

5. A differential commutation ticket consisting of a body part containing a contract and separate groups of coupons, one group marked and distinguished by the contract as limited to a short time and to a person, the other not limited to a short time or to a person, said ticket having at one end an agent's stub and at the other end an auditor's stub, substantially as described.

6. A differential commutation ticket consisting of a body part containing a contract and a continuous series of coupons segregated into groups, the groups being marked and specified as of different limitation of time for use.

7. A ticket comprising in combination, an explanatory contract and a continuous consecutively numbered series of coupons, a part of said coupons being marked and distinguished by the contract as of different duration and applicability of use from the rest, and being distinguished therefrom by different color or texture, substantially as described.

In testimony whereof I have hereunder signed my name in the presence of the two subscribed witnesses.

GEORGE H. SARGENT.

Witnesses:
PAUL CARPENTER,
EDWARD C. BURNS.